United States Patent [19]

Busse

[11] 4,131,376
[45] Dec. 26, 1978

[54] FITTING FOR DETACHABLE CONNECTING STRUCTURAL PARTS

[75] Inventor: Peter Busse, Vlotho, Germany

[73] Assignee: Richard Heinze, Germany

[21] Appl. No.: 776,428

[22] Filed: Mar. 10, 1977

[30] Foreign Application Priority Data

Mar. 11, 1976 [DE] Fed. Rep. of Germany ....... 2610200
Jun. 4, 1976 [DE] Fed. Rep. of Germany ....... 2625182

[51] Int. Cl.$^2$ ............................................. F16B 12/20
[52] U.S. Cl. ..................................... 403/12; 403/231;
403/297; 312/263; 52/285
[58] Field of Search ................ 403/231, 297, 290, 192,
403/195, 323, 322, 11, 12, 16; 312/263; 52/127, 285

[56] References Cited

U.S. PATENT DOCUMENTS 3,331,623  7/1967  Baresel-Bofinger ................. 403/231

FOREIGN PATENT DOCUMENTS 1954810  5/1971  Fed. Rep. of Germany ........... 312/263
2228962 11/1973  Fed. Rep. of Germany ........... 403/297
2308842 11/1973  Fed. Rep. of Germany ........... 403/264
1311150 10/1962  France ....................................... 89/9 R
562968   6/1975  Switzerland ............................. 403/297
964917   7/1964  United Kingdom ..................... 403/343

Primary Examiner—Andrew V. Kundrat
Attorney, Agent, or Firm—Jacobs & Jacobs, Inc.

[57] ABSTRACT

The present invention relates to a fitting for the detachable connecting of structural parts, and particularly of flat structural or cabinet parts. The fitting consists of a locking element which is rotatably inserted in a first construction part and of a connecting member which can be anchored in a second construction part and which cooperates, for the clamping together of the structural parts, with a first eccentric surface on the locking element. The fitting is developed in the manner that the connecting member has a bolt-shaped or pin-shaped element or clamping pin which is adapted to be displaced by the first eccentric surface relative to the locking element upon the turning of the latter in order to anchor the connecting member in the second structural part.

15 Claims, 37 Drawing Figures

(I-I)

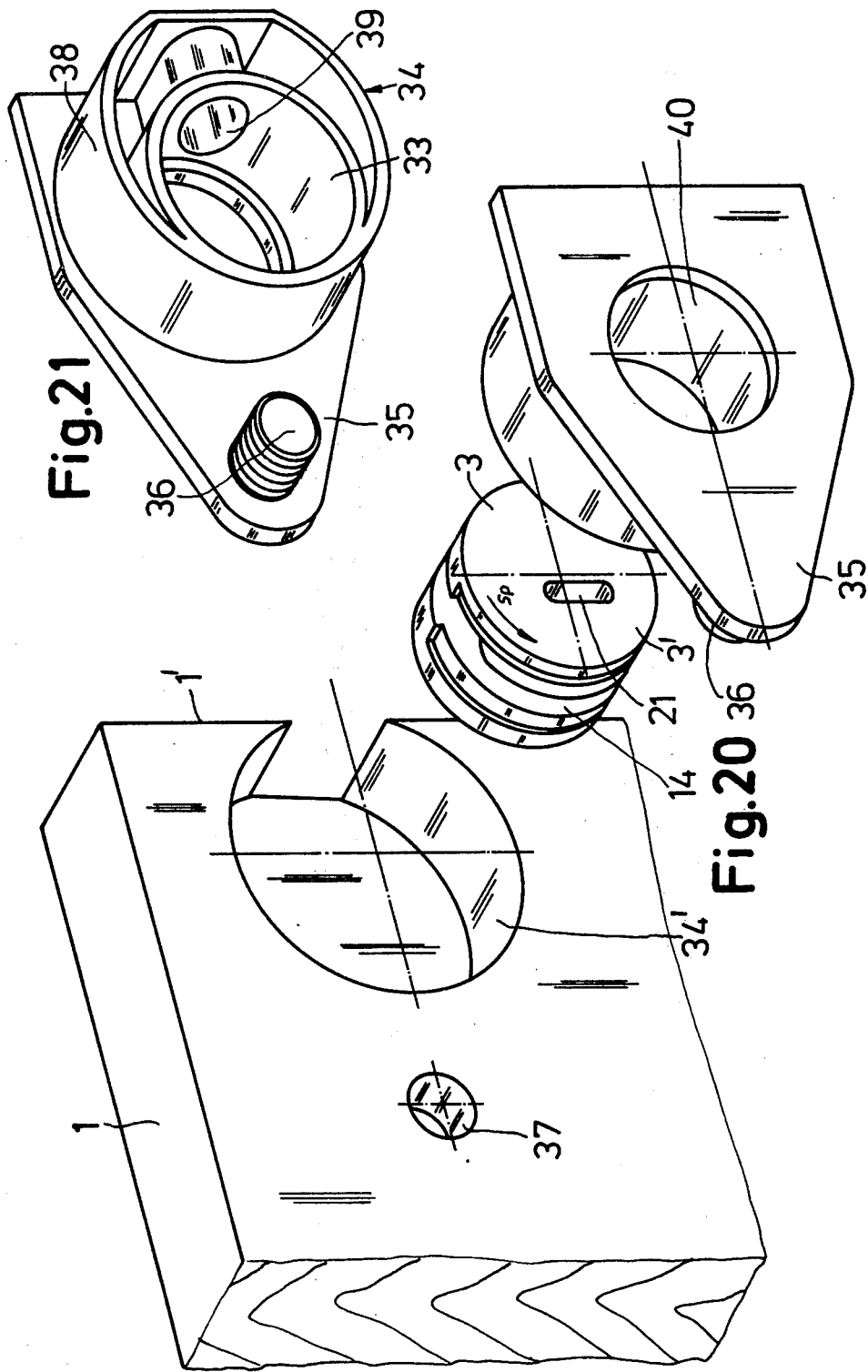

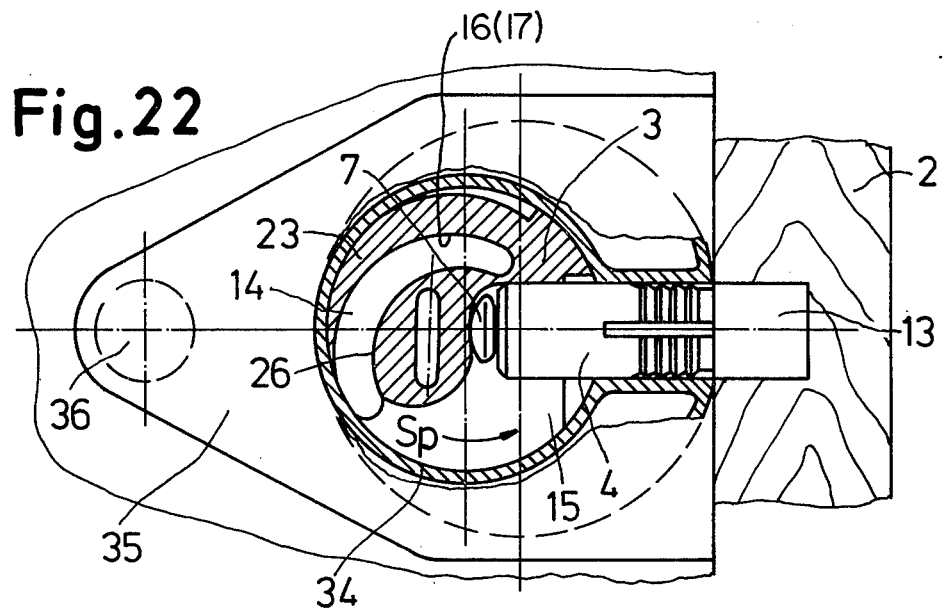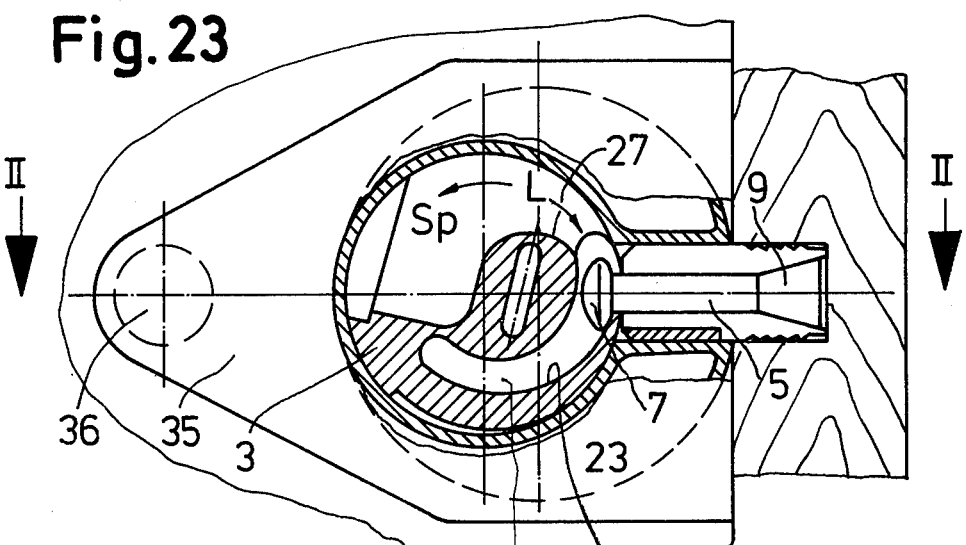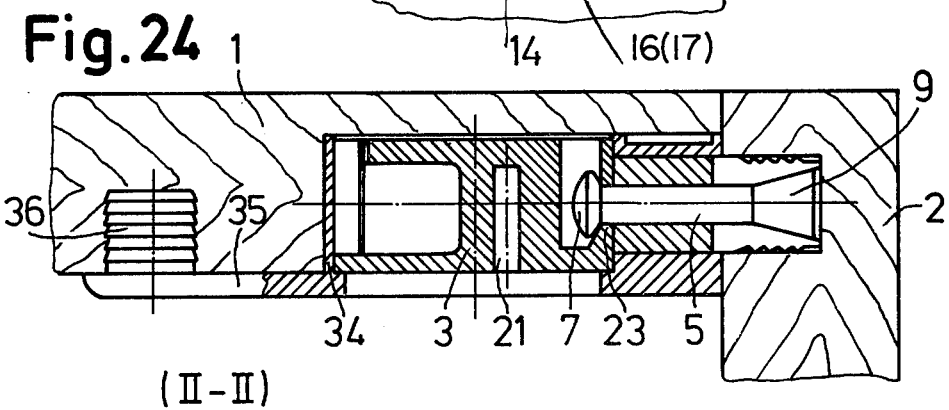

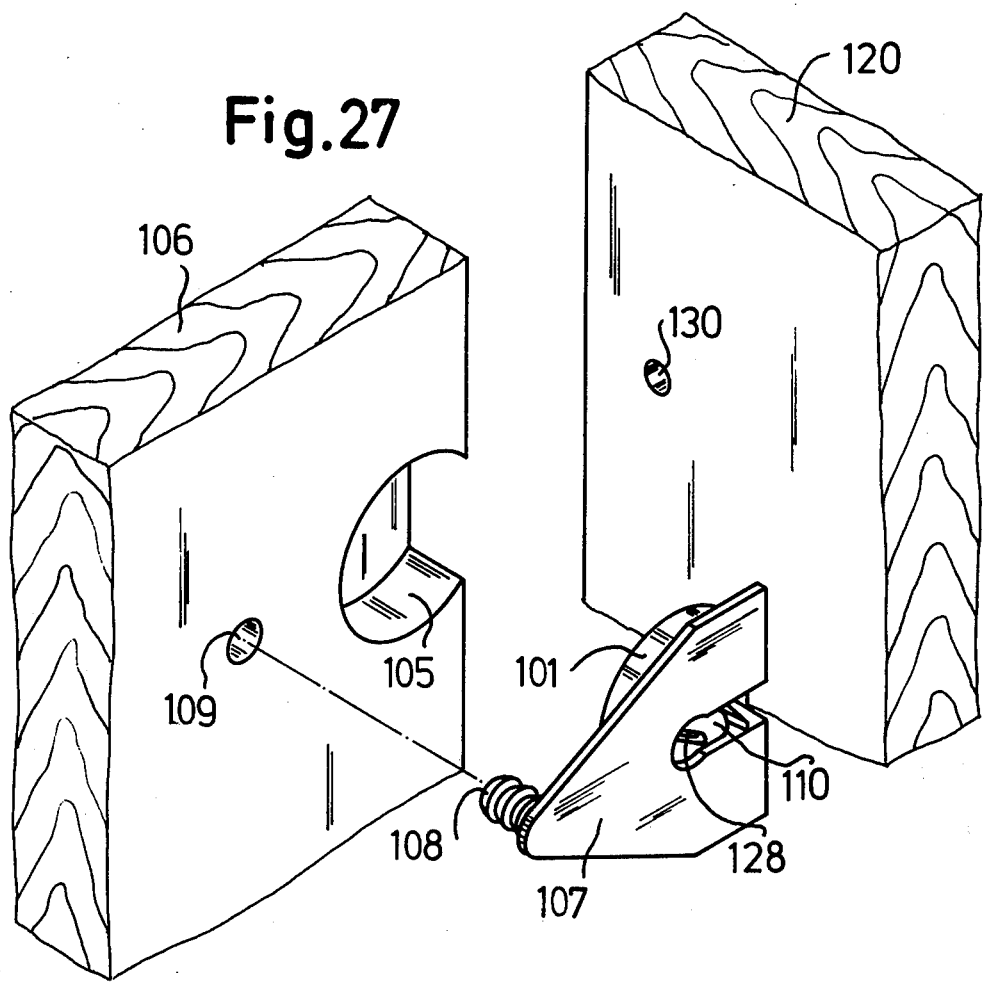
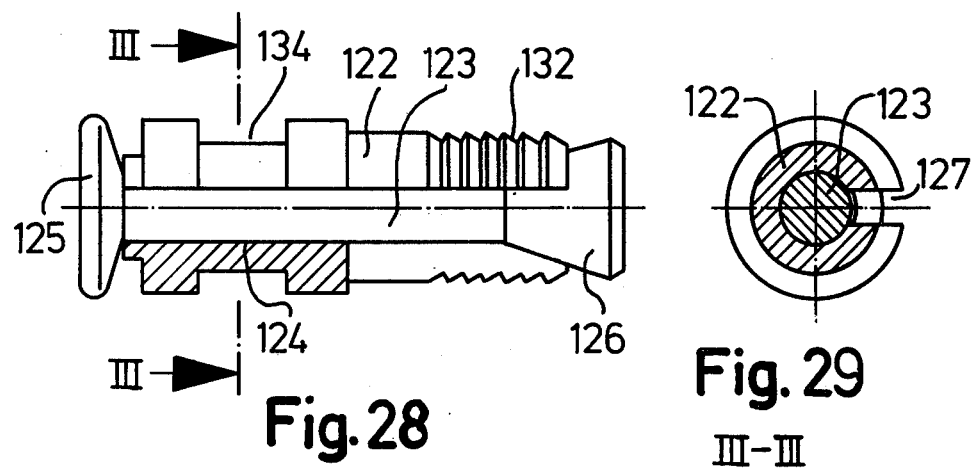

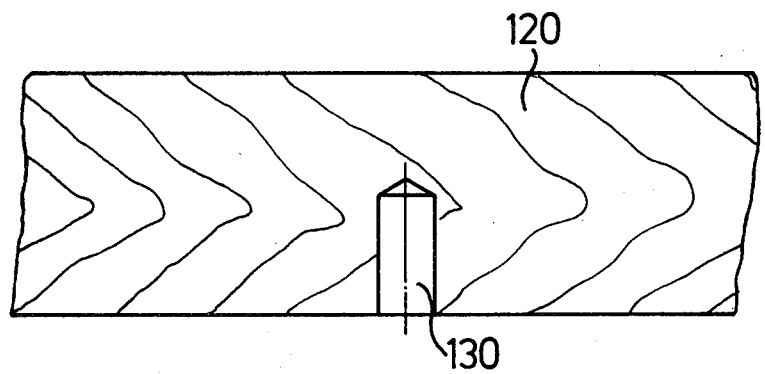
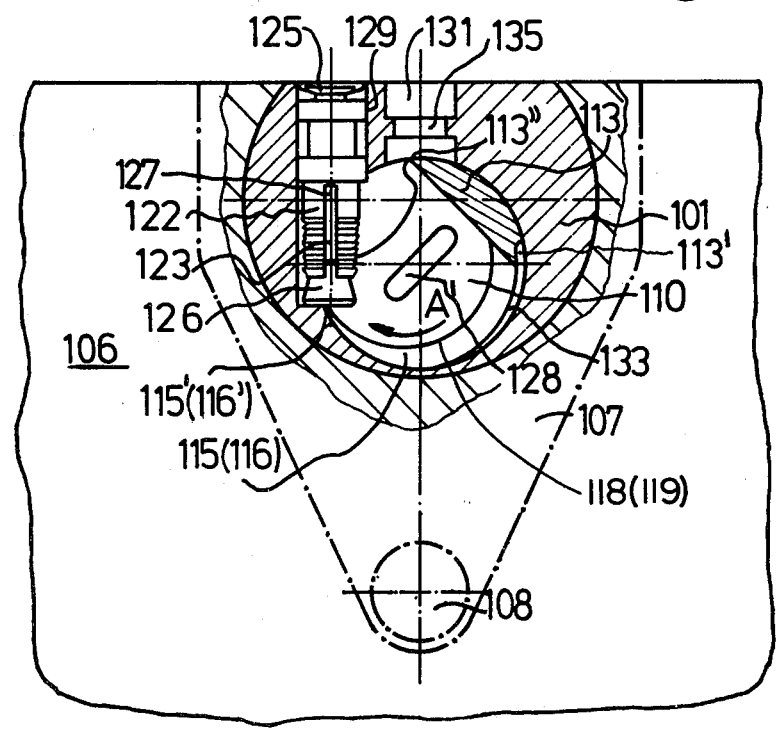
Fig.30

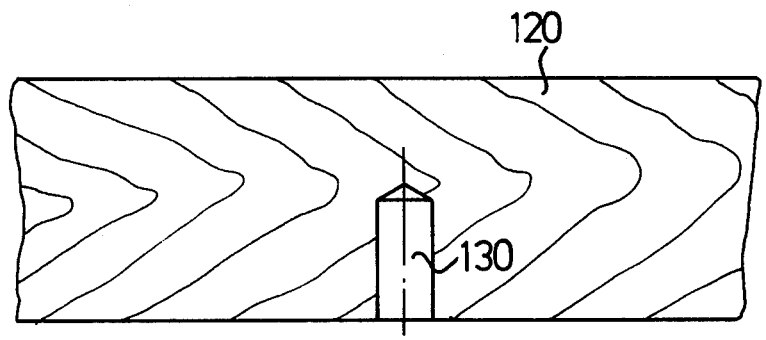
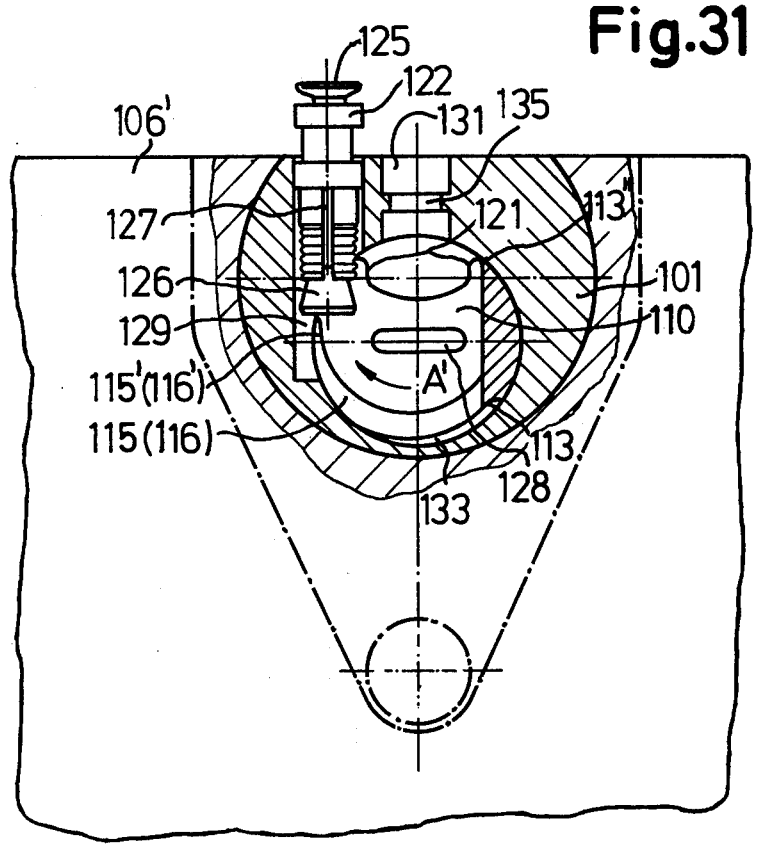
Fig.31

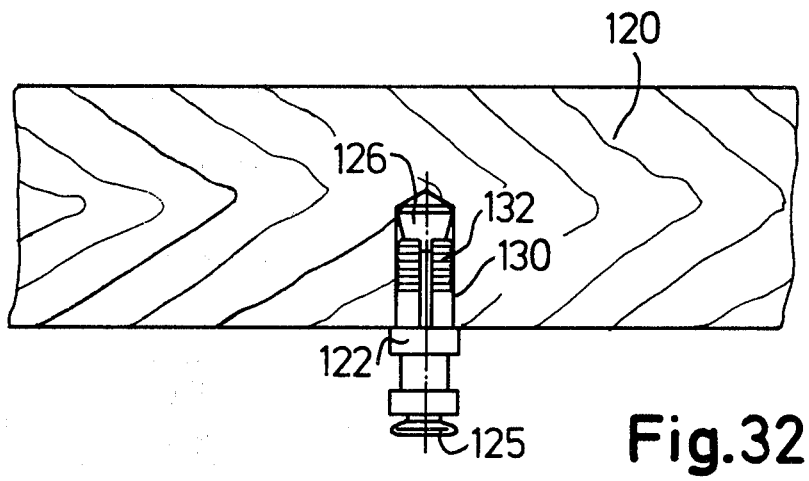
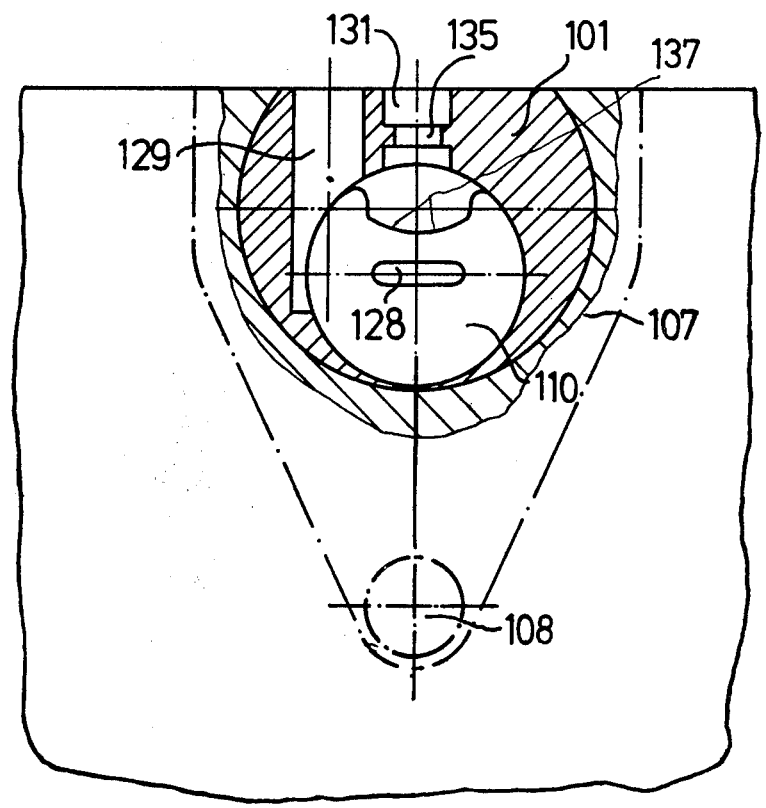
Fig.32

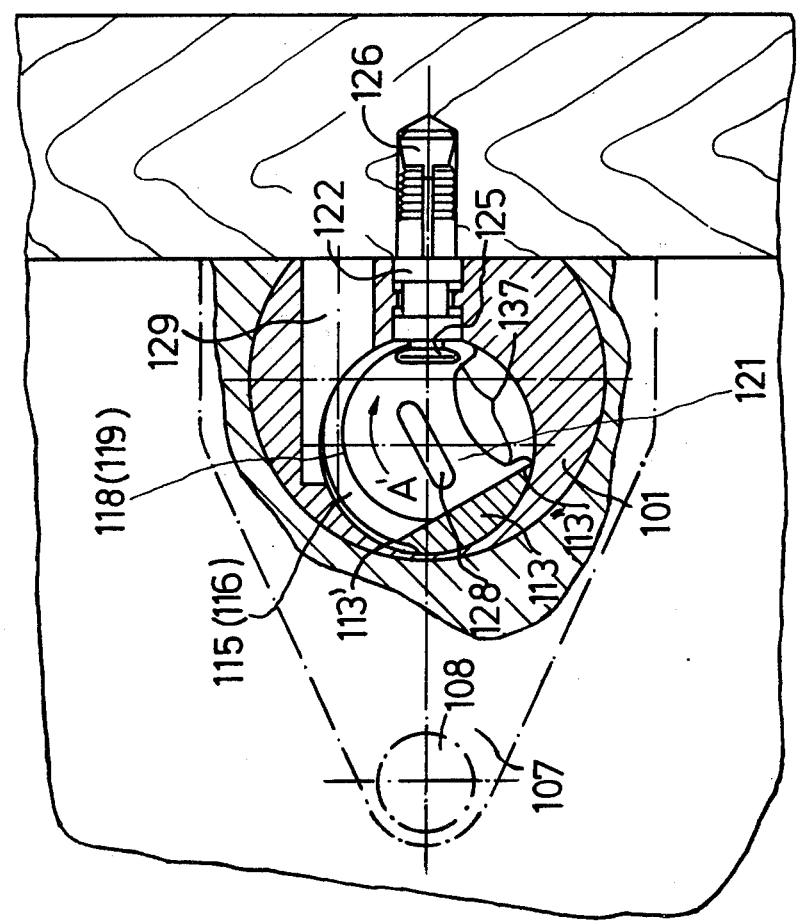

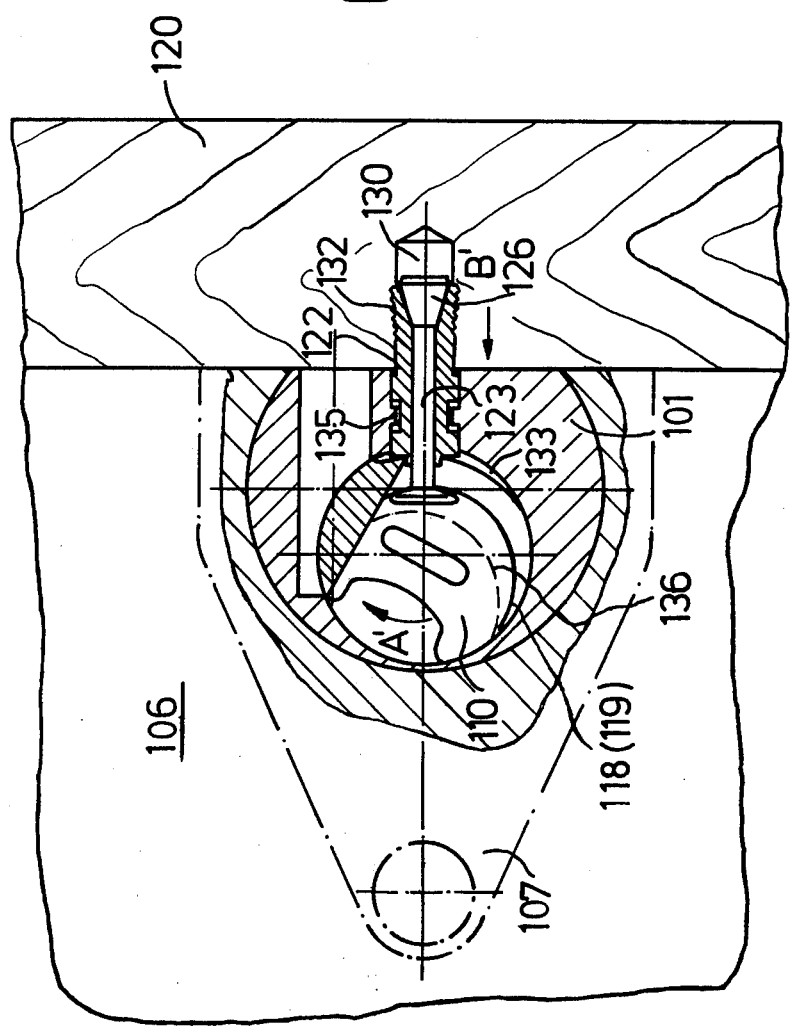

FITTING FOR DETACHABLE CONNECTING STRUCTURAL PARTS

The present invention relates to a fitting for the detachable connecting of structural parts, and in particular of flat structural parts, having a locking element which is rotatably introduced into the first structural part and a connecting member which can be anchored in a second structural part and cooperates, for the clamping together of the structural parts, with a first eccentric surface on the locking element. Particularly in the field of cabinets, in order to join flat cabinet parts, and particularly cabinet parts which are perpendicular to each other (cabinet side walls, cabinet bottoms, cabinet tops, cabinet rear walls, etc.), increased use is being made of fittings which permit rapid, easy joining of the structural parts and furthermore the disconnecting of said structural parts when necessary, for instance when moving, etc.

The object of the present invention is to create a connecting fitting of the type described above which can be manufactured at low cost, is capable of diversified use, operates in a simple and dependable manner, permits the cabinet parts to be clamped together and detached as frequently as desired, and in connection with which the clamping and the loosening movements can both be carried out by a single manipulation. Furthermore, this fitting is to be so developed that all parts of the fitting, and particularly the locking element as well as the connecting member, can be arranged in a single structural part or cabinet part in non-losable manner suitable for transportation, so that when the cabinets are disassembled with the fitting parts premounted no protruding projections, pins, etc. are present which might lead to damage to the cabinet or cabinet parts when the cabinet is transported in knocked-down condition (in order to reduce the space taken up upon transporation) or is put together by the final user. Furthermore, the fitting is to be so developed that assembling and disassembling can be effected with ordinary tools which are generally available, for instance a single screw driver, without requiring any great technical skill.

In order to achieve this object, a fitting of the type described above is developed, in accordance with the invention, in the manner that the connecting member has a bolt-shaped or pin-shaped element or clamping pin which is adapted to be displaced by the first eccentric surface relative to the locking element upon the turning of the latter, in order to anchor the connecting member in the other structural part.

In one preferred embodiment of the invention a second eccentric surface is also provided by means of which, upon the turning of the locking element, the connecting element is displaceable relative to the locking element together with the clamping pin arranged inthe connecting member, so that the connecting member is displaceable from a first position of non-use, in which the connecting member is completely or practically completely included within the one structural part or the locking element, into a second position in which the connecting member protrudes beyond the surface of the one structural part and can engage into the other structural part for anchoring.

The fitting in accordance with the invention, while being economical to manufacture, permits of simple operation and provides a dependable connection of the cabinet parts. In addition, all parts of the fitting of the invention can be premounted in the one cabinet part or structural part without any pins or other elements protruding beyond the surfaces of the structural parts when they are being transported, broken-down.

In the fitting of the invention, the locking element is preferably of cylindrical or partially cylindrical development, the connecting member being formed, for instance, of an expansion dowel within the longitudinal borehole of which there is arranged an expanding or clamping pin which is displaceable by the first eccentric surface relative to the expansion dowel and is widened in conical or frustoconical shape, for instance, on the end thereof facing away from the locking element in order to expand the expansion dowel.

It is, for instance, also possible to provide in the first structural part a cup-shaped or cylindrical housing having a first borehole to receive the rotatable locking element, this housing then being provided on its peripheral wall with a second borehole whose axis extends perpendicular to the axis of the first borehole and opens into the first borehole. The connecting member lies, in this connection, at least in part within said second borehole when the structural parts are connected.

In order to avoid, in particular, the protrusion of the connecting member beyond the surface of the first structural part when the structural parts are separated, the said connecting member, when the structural parts are separated, is inserted fully into the second borehole of the housing or else into a corresponding borehole in the first part of the cabinet, further eccentric surfaces being, for instance, provided on the locking element, and, upon actuation of the locking element, first of all producing the pushing of the connecting member out of the corresponding borehole in such a manner that the connecting member protrudes beyond the surface of the first structural part before the connecting member is anchored in the second structural part.

As a further development of the invention, it is also possible, when using a housing having a locking element arranged in the inner space or in the first borehole of said housing, to provide, in the housing wall, a third borehole which extends into this inner space of the housing, in which case the connecting member, when in condition of non-use, is enclosed, at least in part within said third borehole and extends into the region of movement of a stop surface on the locking element said surface pushing the connecting member out of said third borehole upon the actuating or turning of the locking element. With this development of the fitting in in accordance with the invention, there is thus the possibility of arranging all parts of the fitting, including the connecting member within the housing, even when the fitting is in its condition of non-use, i.e. for instance, for the transportation of the fitting or of a cabinet part premounted with the fitting, so that the fitting can be delivered, complete, by the manufacturer of the fitting to the cabinet manufacture and also, in condition mounted on the first structural part, by the cabinet manufacturer to the final user, without any parts of the fitting protruding in disturbing fashion beyond the outer side of the fitting or beyond the outer side of a cabinet part which has been premounted with the fitting.

This embodiment of the fitting in accordance with the invention, in which the individual parts of the fitting cannot be lost during the transportation due to the fact that the connecting member is stored in the third borehole or the transportation borehole, can also be mounted and removed in simple fashion. For the connecting of the structural parts or cabinet parts, the connecting member is pushed out, for instance, by turning the locking element out of the transport borehole in the housing and it can be inserted, for instance, into an anchoring borehole in the second structural part, whereupon, after the structural parts have been placed against each other, they are connected or clamped together by the interaction of the connecting member with the first eccentric surface of the locking element.

The "condition of non-use" corresponds in this connection to the arrangement of the fitting parts for the transportation of the fitting, and particularly the arrangement of the connecting member within the additional third borehole or within the transportation borehole, while the "condition of use" corresponds to a position of the fitting parts in which the connecting member has been removed from the additional borehole and the fitting parts assume the position necessary for the anchoring or the mutual fastening of the structural parts to each other.

The fitting of the invention can in principle advantageously be developed in the manner that it can be fastened to cabinet parts with the production tools present at the cabinet manufacturers, for instance drills, etc., so that when the fitting of the invention is used no new machine equipment is required by the cabinet manufacturers.

Further developments of the invention are described in the subordinate claims.

The invention will be explained in further detail below on basis of embodiments shown in the figures, in which FIG. 1 shows, in a perspective exploded view, two structural parts in the form of flat cabinet parts, together with a fitting in accordance with the invention;

FIG. 20 shows in an exploded perspective view a third embodiment of the fitting of the invention together with a flat cabinet part;

FIG. 21 shows in an individual perspective view a housing for use with the fitting in accordance with FIG. 20 seen from the rear side, which is not visible after installation;

FIGS. 22 and 23 show the fitting of FIG. 20 before the use of the flat cabinet parts and at the start of the clamping together of said cabinet parts;

FIG. 24 is a section through the two flat cabinet parts and through the fitting of FIG. 20 along the line II—II of FIG. 23;

FIG. 27 shows in perspective the fitting of FIG. 25 together with two flat cabinet parts;

FIGS. 28 and 29 show an expansion dowel serving as connecting member, seen in side view, partially cut, and in cross section, for use with the fitting in accordance with FIG. 25;

FIG. 30 shows the two flat cabinet parts together with the fitting of FIG. 25, with the connecting member arranged in the transportation borehole of the fitting;

FIG. 31 shows the two flat cabinet parts as well as the fitting of FIG. 25 with the connecting member partially extending out of the transportation borehole;

FIG. 32 shows the two flat cabinet parts and the fitting of FIG. 25 with the connecting member removed from the transportation borehole of the fitting or housing, before the connecting of the flat cabinet parts;

FIGS. 34 and 35 show the fitting of FIG. 25 in different phases of the clamping or connecting of the two flat cabinet parts.

Figure 1:
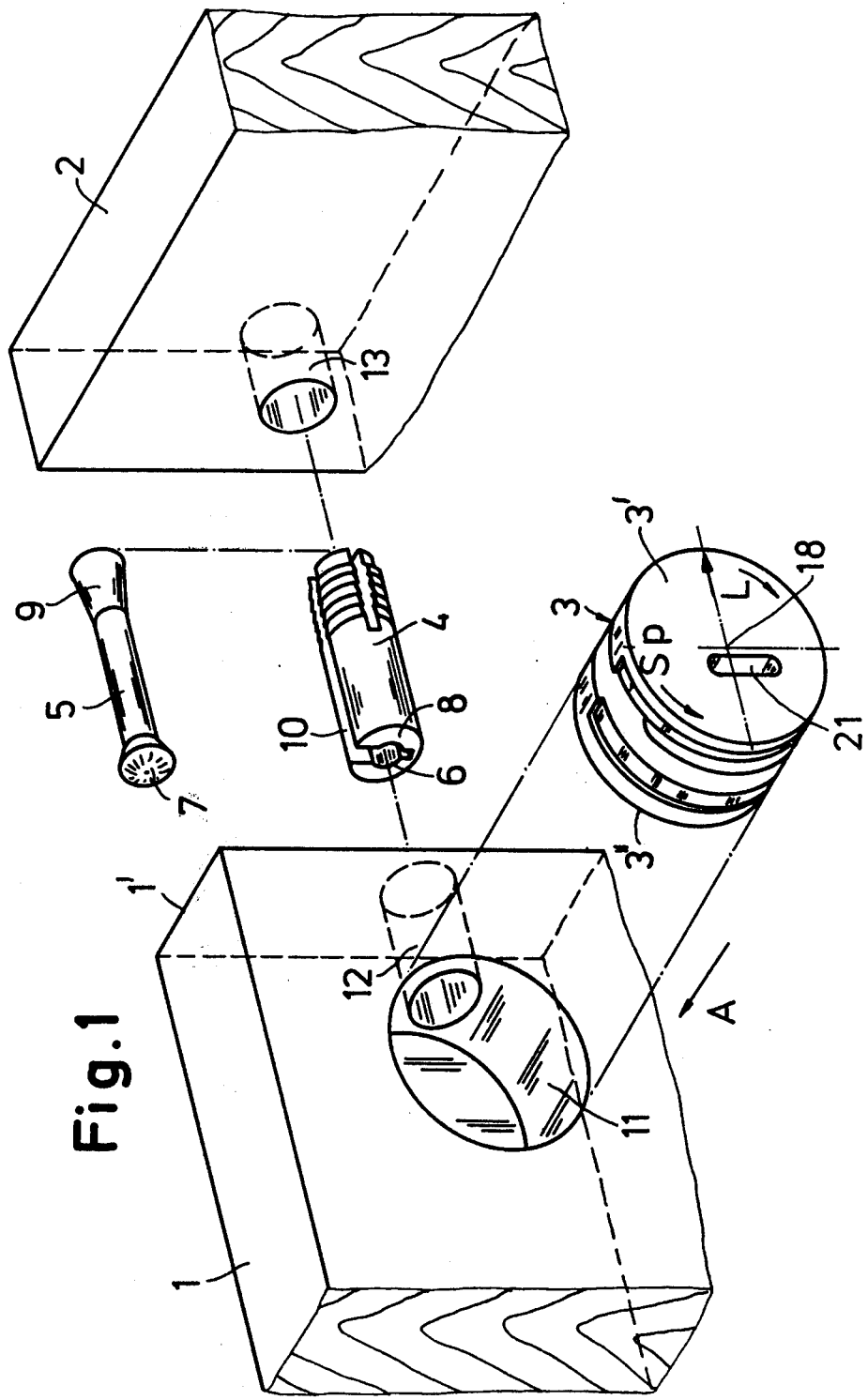
Figure 2:
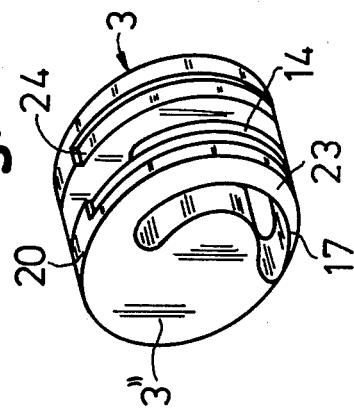
FIG. 2 shows in perspective a section through the locking element of the fitting of FIG. 1.
Figure 3:
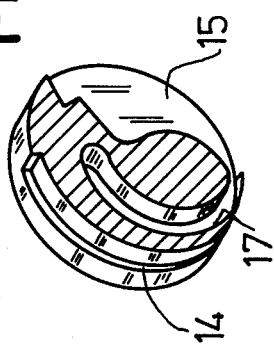
FIG. 3 shows in perspective the locking element of the fitting of FIG. 1 from the rear side of said element, which is not visible after installation.
Figure 5:
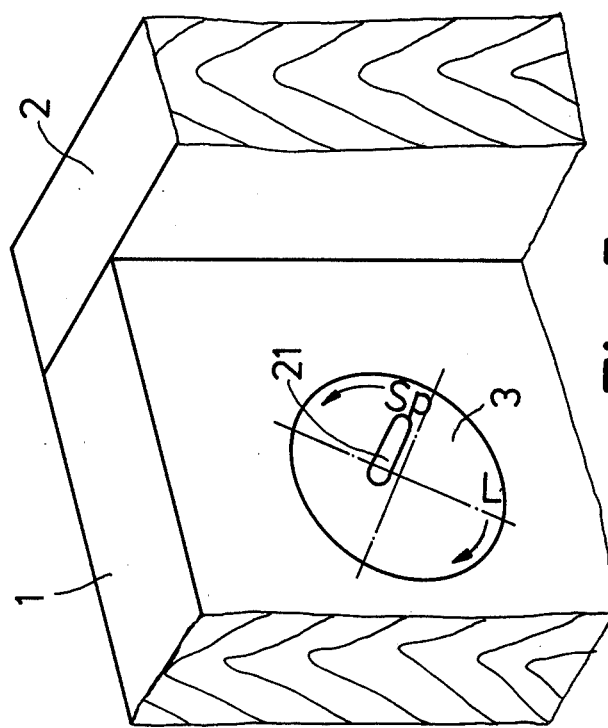
FIG. 5 shows in partial perspective view the two board-shaped cabinet parts after they have been connected by the fitting shown in FIG. 1.
Figure 4:
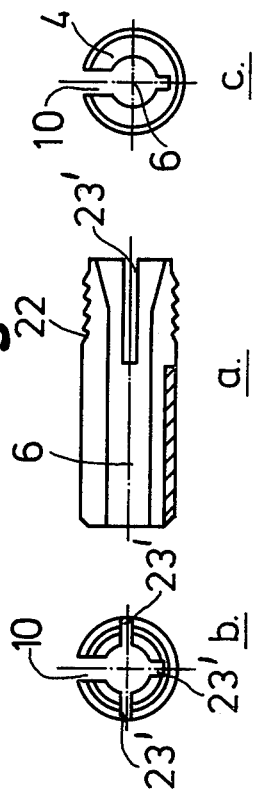
FIG. 4a to 4c show an expansion dowel serving as connecting member in longitudinal section and furthermore seen from the end facing away from the locking element and the end facing the locking element.

In FIGS. 1 to 25, 1 and 2 are two flat cabinet parts, for instance two cabinet walls, which, for simplicity in showing, have in each case only been shown in part and which are to be connected together in such a manner that they extend at a right angle to each other and the cabinet part 1 has its front surface 1' resting against the surface side of the flat cabinet part 2 which is visible for instance, in FIG. 1.

For the detachable joining of these flat cabinet parts 1 and 2 there is employed a fitting which consists, in the embodiment shown in FIGS. 1 to 15, of the cylindrical locking element 3, the sleeve-shaped expansion dowel 4, and the clamping pin or expansion bolt 5 which is so arranged in a longitudinal borehole 6 of the expansion dowel 4 that the thickened head end 7 of the clamping pin 6 protrudes beyond the front side 8 of the expansion dowel 4 which faces the locking element 3. In order to introduce the clamping pin 5, which is provided at its other end with an expansion taper 9, into the longitudinal borehole 6 of the expansion dowel 4, the latter is provided with a longitudinal slit 10 which passes through it and extends to the longitudinal borehole 6, through which slit the clamping pin can then be introduced, with a certain deforming of the material of the expansion dowel 4, into the longitudinal borehole 6 of said dowel.

In order to receive the locking element 3 there is provided in the cabinet part 1 a borehole 11 which extends perpendicuar to the surface sides of said cabinet part, said borehole being preferably developed as a blind hole, i.e. open only towards one surface side, and into which there opens a borehole 12 for the expansion dowel 4, said borehole 12 being parallel to the surface sides of the cabinet part 1 and open towards the front surface 1', the end of the expansion dowel facing away from the locking element 3 then extending, when the cabinet parts 1 and 2 are clamped together, into a borehole 13 which extends perpendicular to the surface sides of the cabinet part 2, the dowel being anchored in said borehole, as will be described further below.

The locking element 3 is provided, distributed over its periphery, with two recesses 14 and 15 which are open laterally and towards the cylindrical surface of the locking element 3, the recess 14 being developed as a narrow slot with undercuts 16 and 17 in each case at the inner edge of the slot, and the width of the slot forming the recess 14 corresponds approximately to the cross section of the clamping pin 5 between the head end 7 and the expansion taper 9 or is slightly greater than said cross section but smaller than the cross secton of the broadened head end 7.

Figure 9:
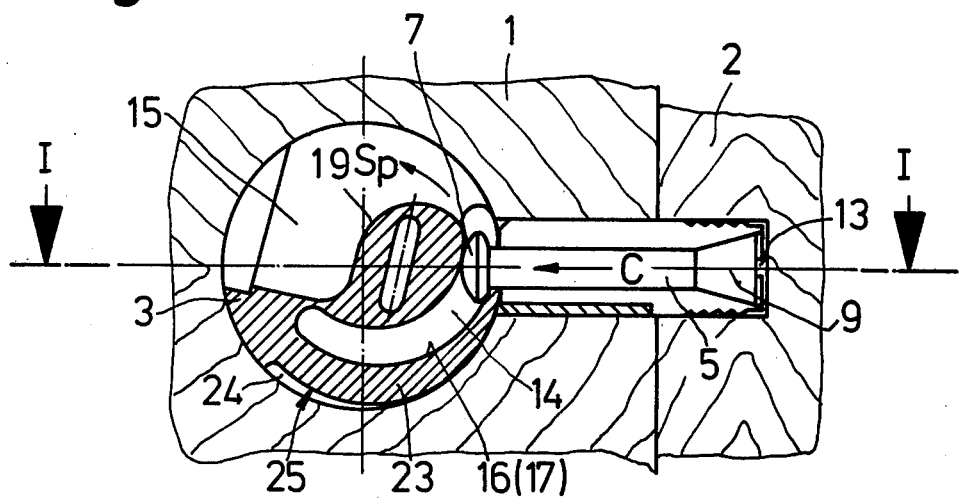
Figure 10:
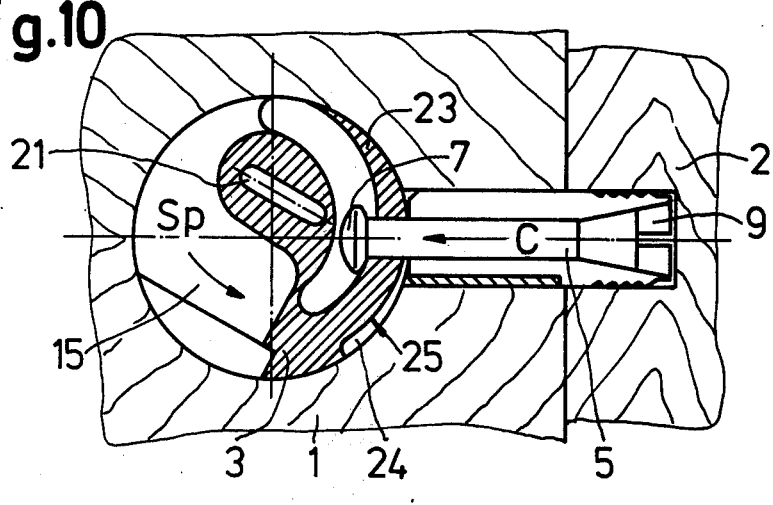
Figure 11:
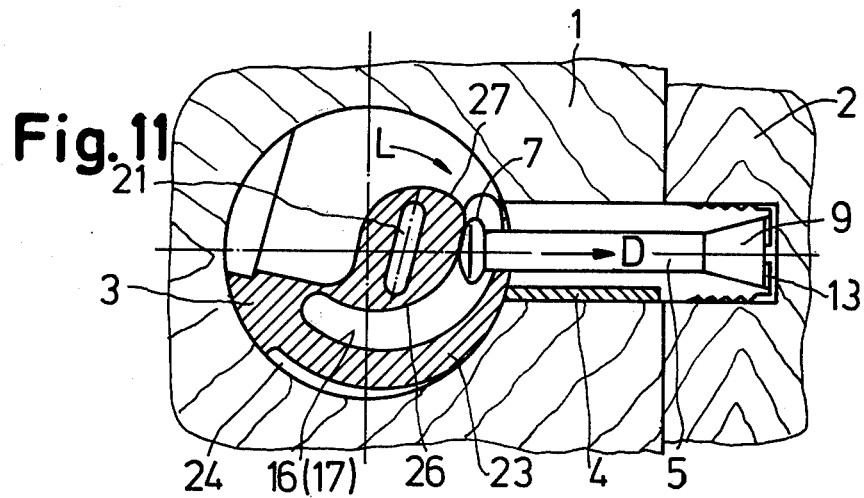
FIGS. 11 to 14 show the fitting of FIG. 1 in different phases of the loosening or separating of the two flat cabinet parts.

The undercuts 16 and 17 form two eccentric surfaces extending parallel to each other, which have a distance from the center point or axis of rotation 18 of said locking element which changes in the circumferential direction of the locking element 3, and behind which the thickened head end 7 of the clamping pin 5 engages in order to clamp the cabinet parts 1 and 2 together (see FIGS. 9 to 11).

The recess 15, in contradistinction to the recess 14, has such a width that when the cabinet parts 1 and 2 are not connected (FIG. 6) the thickened head end 7 of the clamping pin 5 and also, in part, the expansion dowel 4 extend into said recess 15 so that the expansion dowel 4 does not protrude beyond the front surface 1' of the cabinet part 1 when the cabinet parts 1 and 2 are not connected to each other. This has the advantage that the cabinet part 1 can be premounted with the entire fitting by the cabinet manufacturer and the cabinet parts can be transported in broken-down condition in order to reduce the space taken up for transportation, without parts of the fitting protruding in disturbing manner beyond the surface of the cabinet part 1. The falling of the locking element 3 out of the borehole 11 of the cabinet part 1 is in particular impossible since the expansion dowel 4, which extends into the recess 15 and the circumferential surface of which rests against the side surfaces of the recess 15 which close the latter on the front and rear sides 3' and 3" respectively of the locking element 3, holds the locking element 3 fast in the borehole 11 of the cabinet part 1. The expansion dowel 4 is in this connection held e.g. by a force fit in the borehole 12 so that undesired displacement of said expansion dowel will also not occur during transportation.

Figure 6:
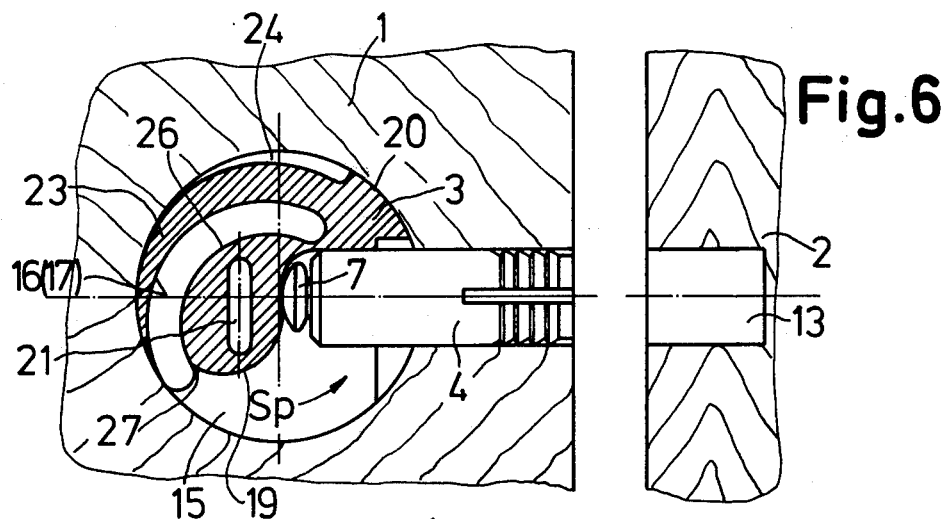
FIGS. 6 to 10 show the fitting of FIG. 1 in different phases of the clamping or connecting of the two flat cabinet parts.
Figure 7:
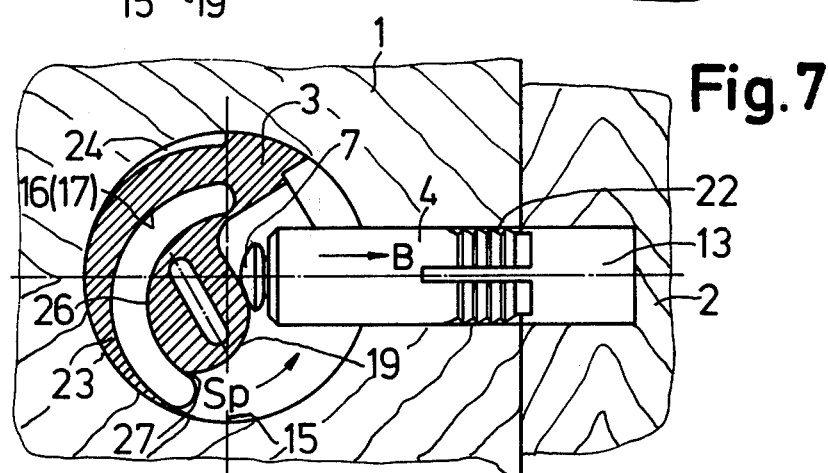

As bottom surface the recess 15 has an eccentric surface 19 whose distance from the circumferential surface 20 of the locking element 3 decreases in circumferential direction and against which the thickened head end 7 of the clamping pin 5 rests when the cabinet parts are not clamped together (FIG. 6). The joining of the flat cabinet parts 1 and 7 is effected in the following manner with the fitting shown in FIGS. 1 to 15.

First of all, the fitting parts (locking element 3, expansion dowel 4, and clamping pin 5) are arranged in the cabinet part 1 in the manner shown in FIG. 6. For this purpose, the locking element 3 is first of all pushed, in the direction indicated by the arrow A of FIG. 1, into the borehole 11 provided in the cabinet part 1 and is then so turned, for instance by means of a screw driver, not shown in further detail, which engages into the slot 21, that the deepest region of the recess 15 faces the borehole 12. The slot 21 is located for this purpose on the front side 3', which is visible also after the introduction of the locking element 3 into the borehole 11. The expansion dowel 4 which has been premounted with the clamping pin 5 is now inserted from the front side 1' into the borehole 12 and into the recess 15 to such an extent that the end of the expansion dowel 4 facing away from the locking element 3 no longer protrudes beyond the front surface 1'. In this condition, the cabinet part 1 can be shipped.

Figure 8:
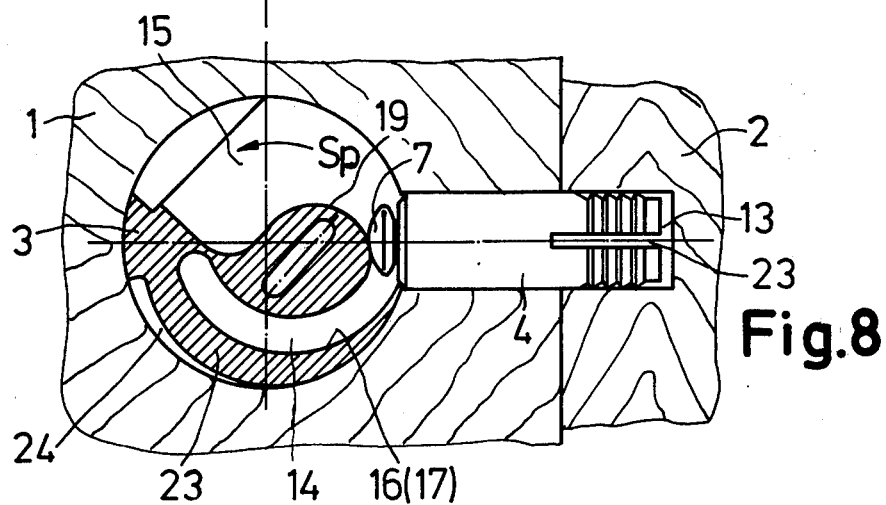

For the connecting or clamping together of the cabinet parts 1 and 2, they are so arranged with respect to each other that the boreholes 12 and 13 coincide. By turning the locking element 3 in the direction indicated by the arrow Sp in FIGS. 6 to 10, using a screwdriver engaging into the slot 21, the expansion dowel 4 is then first of all pushed, together with the clamping pin 5, the thickened head end of which rests against the eccentric surface 19, by said eccentric surface in the direction indicated by the arrow B of FIG. 7 i.e. in the direction of the longitudinal axis of the borehole 12 to such an extent that the end of the expansion dowel 4 which is provided with the barbed profile 22 and faces away from the locking element 3, extends onto the borehole 13 of the cabinet part 2 (FIG. 8).

Upon further turning of the locking element 3 in the direction indicated by the arrow Sp, the undercuts 16 and 17, which form the eccentric surfaces, engage behind the thickened head end of the clamping pin 5, i.e. the regions 23 of the locking element 3 defining the slot-shaped recess 4 on the front side 3' and the rear side 3" of the locking element, engage around the clamping pin 5 in the region of its thickened head end 7 in fork-shaped manner and move in wedge-shaped fashion between the thickened head end 7 of the clamping pin 5 and between the front side of the expansion dowel 4 facing the locking element 3. In this way, the expansion pin 5 is moved in the direction indicated by the arrow C in FIGS. 9 and 10 relative to the expansion dowel 4 towards the locking element 3, as a result of which the expansion taper 9 of the clamping pin 5 effects an expanding of the end of the expansion dowel 4, which is provided with the barbed profile 22 and with additional expansion slots 23 so that the expansion dowel 4 is anchored in the borehole 13 of the cabinet part 2. Since the front side 8 of the expansion dowel 4 first of all rests against the circumferential surface 20 of the locking element 3, the expansion dowel 4 at the start of the expansion (FIG. 9) retains its position relative to the cabinet parts 1 and 2.

Within the region of the slot-shaped recess 14, the locking element 3 is provided on its circumferential surface 20 with a depression 24 of a depth which increases in the circumferential direction of the locking element 3, the width of this depression 24 in the direction of the axis of rotation of the locking element being equal to or greater than the cross section of the expansion dowel 4 on the front side 8. In this way, the result is obtained that, commencing approximately at a position of rotation of the locking element 3 such as shown in FIG. 10, the expansion dowel 4, which upon further turning of the locking element 3 in the direction of the arrow Sp now rests against the bottom surface of the depression 24, is also displaced in the direction of the arrow C relative to the cabinet part 1, whereby the two cabinet parts 1 and 2 are firmly pressed against each other.

Figure 12:
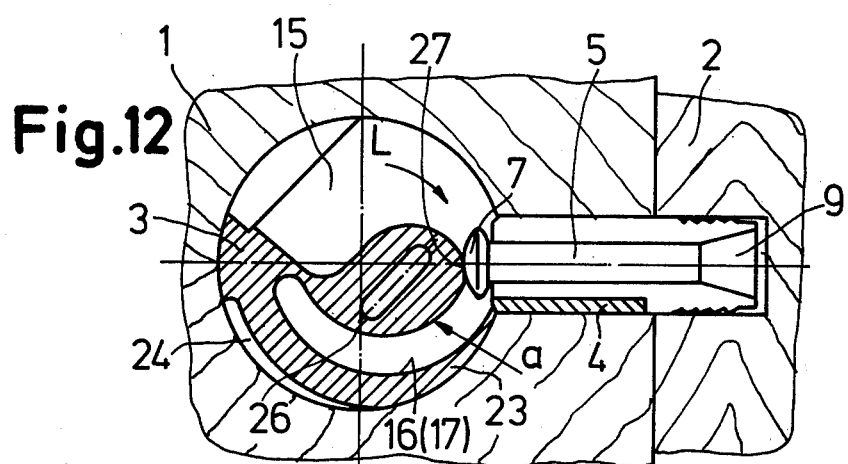
Figure 13:
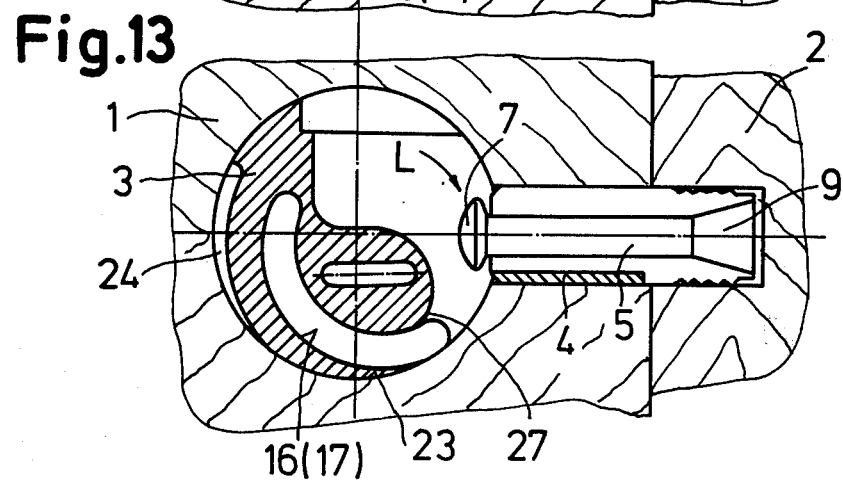
Figure 14:
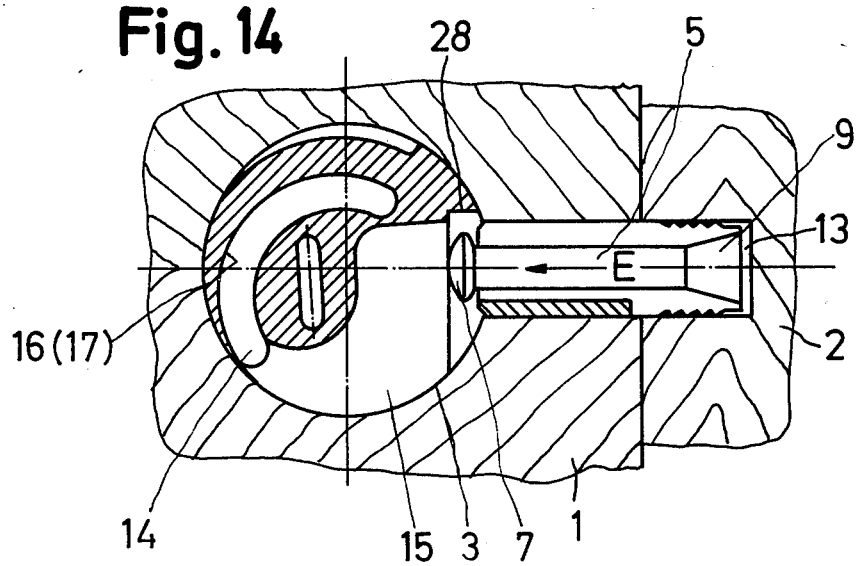
Figure 15:
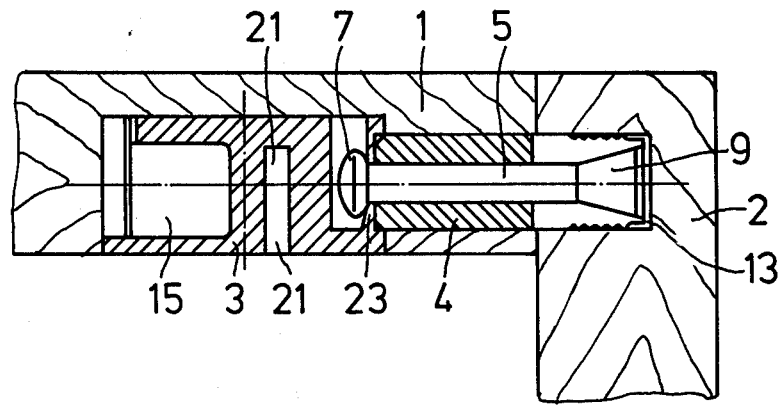
FIG. 15 is a section through the two cabinet parts connected with each other, through the fitting of FIG. 1 along a line 1—1 of FIG. 9.
Figure 16:
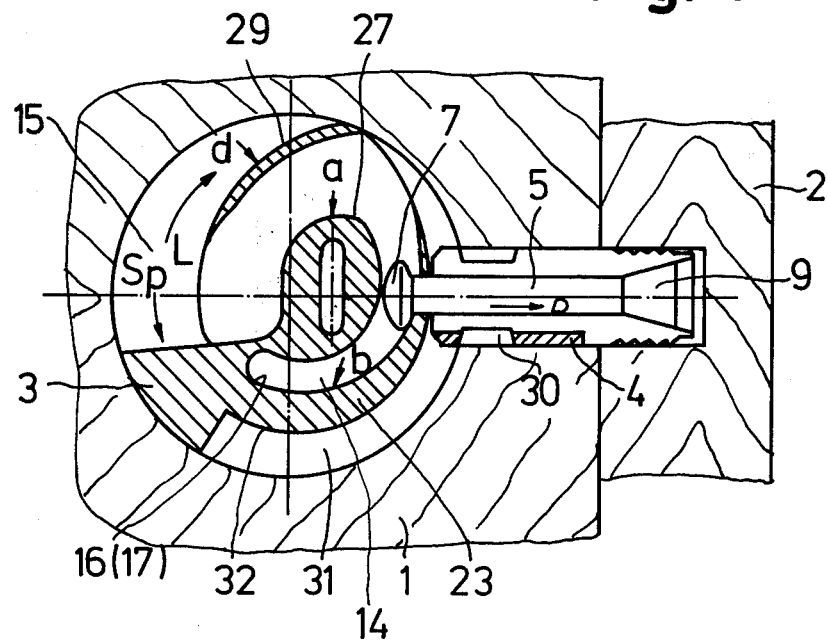
FIG. 16 is a similar view to FIG. 9, but of a second embodiment of the fitting in accordance with the invention.

The loosening of the two cabinet parts 1 and 2 is then effected by turning the locking element 3 in the direction indicated by the arrow L in FIGS. 11 to 13, i.e., in the showing given in the figure, by turning it in clockwise direction. In this way the clamping pin 5, the head end 7 of which rests against the bottom surface 26 of the recess 14, which surface also extends eccentrically to the central axis 18 of the locking element 3, is first of all pushed back in the direction indicated by the arrow D into the expansion dowel 4 until the position for the locking element 3 shown in FIG. 12 is reached, in which position the head end 7 rests against the region 27 at which the recesses 14 and 15 pass into each other and which is at the shortest distance from the circumferential surface 20 of the locking element 3. The head end 7 of the clamping pin 5 is out of engagement in this position with the undercuts 16 and 17, and the clamping pin 5 is pushed back so far into the expansion dowel 4 that no expansion of the end of this expansion dowel provided with the barbed profile 22 is present any longer. By further turning the locking element 3 in the direction indicated by the arrow L, at least the head end 7 of the clamping pin 5 passes into the recess 15 and the movement of rotation of the locking element in the direction of the arrow L is limited when the head end 7 of the clamping pin 5 lies against the lateral limiting surface 28 of the recess 15. The cabinet parts 1 and 2 can now be separated from each other, the expansion dowel 4 together with the clamping pin 5 being pushed back by hand in the direction indicated by the arrow E into the borehole 12 of the cabinet part 1 and into the recess 15 of the locking element 3 respectively so that no part of the fitting protrudes beyond the surfaces of the cabinet part 1.

Figure 17:
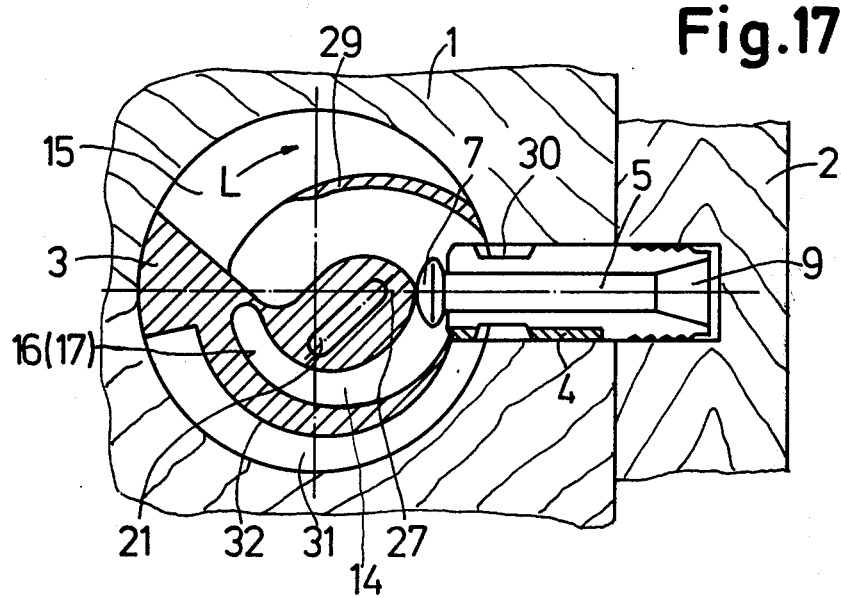
FIGS. 17 to 19 show the fitting of FIG. 16 in different phases of the loosening or disconnecting of the two flat cabinet parts.
Figure 18:
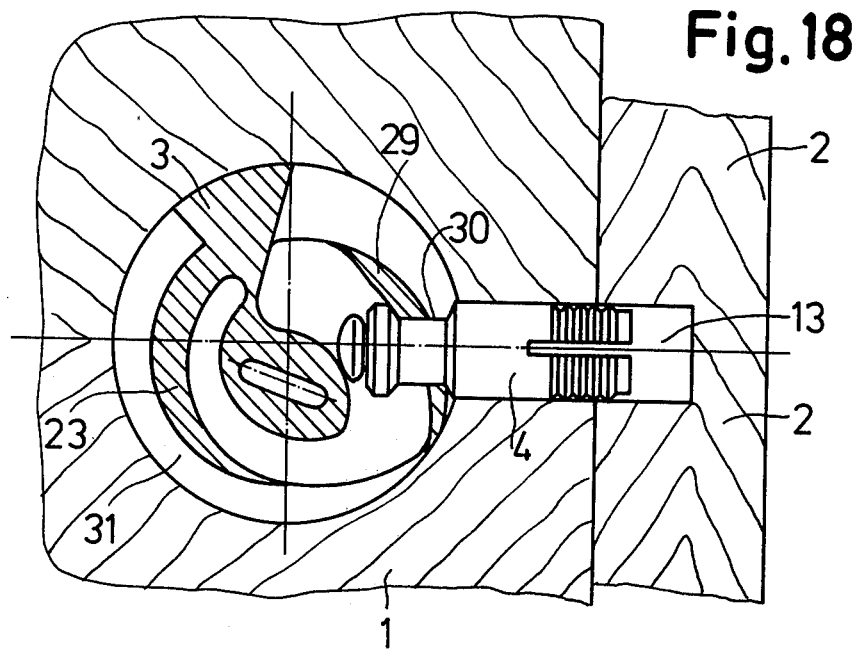
Figure 19:
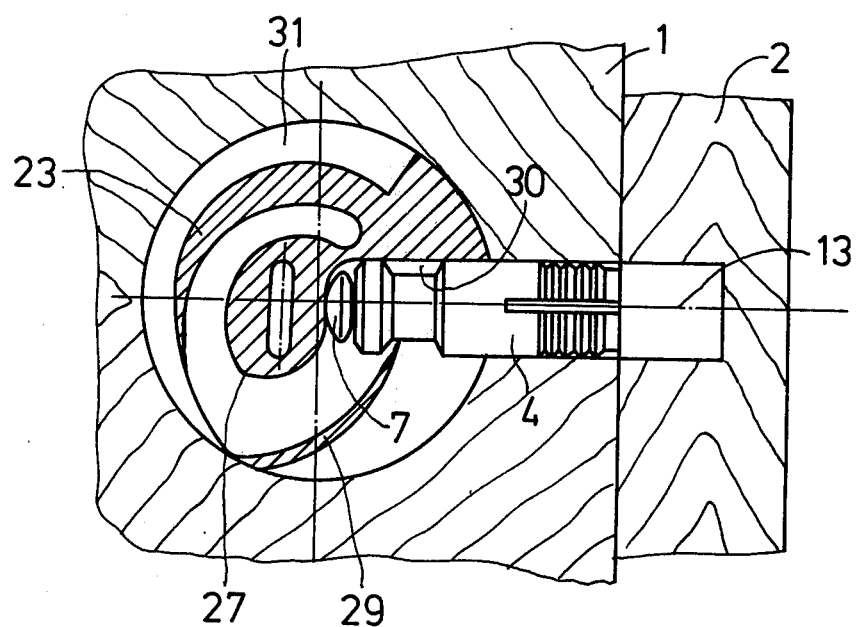

This pushing back of the expansion dowel 4 after the loosening of the cabinet parts 1 and 2 can be avoided, in accordance with the embodiments shown in FIGS. 16 to 19, if an additional eccentric or curved surface 29 is used which comes into engagement with an annular groove 30 of the expansion dowel 4 when the thickened head end 7 of the clamping pin 5 has reached the region 27 upon the loosening of the cabinet parts 1 and 2 (FIG. 17). The cam surface 29 is in this connection formed of two ribs which extend in direction of the axis of rotation 18 of the locking element 3 into the recess 15 and surround the expansion dowel 4 on both sides in the region of the annular groove 30 and, seen in the direction of the arrow L, are at an increasing distance from the axis of rotation 18 terminating approximately at the region 27 at the circumferential surface 20 of the locking element 3. By these cam surfaces 29 the expansion dowel 4 together with the clamping pin 5 are pulled back into the borehole 12 and into the recess 14 respectively upon further turning of the locking element 3 in direction of the arrow L out of the position shown in FIG. 17 so that after the loosening of the cabinet parts 1 and 2 it is no longer necessary to push back the expansion dowel by hand, as shown in FIGS. 18 and 19.

With the embodiment shown in FIGS. 16 to 19 it is furthermore necessary to provide, in the region of the slot-shaped recess 14 on the outer surface of the locking element 3, a depression 31 which extends over the entire length of the slot-shaped recess 14, so that the expansion dowel 4, even upon the position of rotation of the locking element 3 such as shown in FIG. 17, still extends so far laterally into the locking element 3 that the cam surfaces 29 can surround the expansion dowel 4 in the region of the annular groove 30. In order to obtain a clamping of the cabinet parts 1 and 2 against each other upon the rotation of the locking element 3 in the direction of the arrow Sp, i.e. a pressing of the front surface 1' of the cabinet part 1 against the cabinet part 2, the depression 31 is so developed that its bottom surface 32 which serves as stop surface for the front side 8 of the expansion dowel 4 is at an increasing distance, as seen in the direction of the arrow L, from the circumferential surface of the locking element 3, this increase (of the distance) however taking place more slowly than in the case of the eccentric surfaces formed by the undercuts 16 and 17 and cooperating with the thickened head end 7 of the clamping pin 5. Otherwise, the embodiment shown in FIGS. 16 to 19 corresponds in its construction and manner of operation to the fitting described in connection with FIGS. 1 to 15.

FIGS. 20 to 24 show an embodiment of the fitting of the invention in which the locking element 3 is no longer rotatably fastened directly in a borehole of the flat cabinet part 1 but rather in a borehole or a cylindrical inner space 33 of a substantially cup-shaped housing 34 which can be anchored in a circular recess 34' of the flat cabinet part 1. The fastening of the housing 34 in the borehole or recess 34' of the cabinet part 1 can be effected in any desired suitable manner, for instance by gluing, by barb-like ribs formed on the outer circumference of the housing 34 and engaging into the material of the cabinet part 1, or else by an additional fastening pin having a barbed or harpoon-like profile which is developed on a lateral extension 35 and is hammered into an additional borehole 37 of the flat cabinet part 1.

As shown in FIG. 21, the borehole 33 is eccentric to the central axis of the cup-shaped or circular housing 34 and on the side facing away from the extension 35 has a greater distance from the outer surface 38 of the housing 34 than on the side facing the extension 35. In this way, it is possible to provide in the housing 34 another borehole 39 which extends perpendicular to the borehole 33 and serves to receive the expansion dowel 4, it extending perpendicular to the borehole 33 and being open towards the borehole 33 and towards the circumferential surface 38 of the housing 34.

The mounting of the fitting shown in FIGS. 20 to 24 is effected by first of all pushing the locking element 3 into the borehole 33 of the housing 34 in such a manner that the front side 3', provided with slot 21, of said locking element is visible through an opening 40 of reduced cross section. Thereupon, the locking element 3 is turned into the position shown in FIG. 22 and the expansion dowel 4 which has been premounted with the clamping pin 5 is pushed into the lateral borehole 39 so that said expansion dowel comes to lie partially in the recess 15 of the locking element 3 and partially in the borehole 39. The fitting can be supplied in this condition by the manufacturer (fitting manufacturer) to the customer (for instance, cabinet manufacturer).

For the joining of the flat cabinet parts 1 and 2, the housing 34 is then first of all so connected to the flat cabinet part 1 that the bottom of the extension 35 which is visible in FIG. 21 lies against the surface side of the flat cabinet part 1 and the cylindrical part of the housing 34 extends into the recess 34', while the pin 36 is in the borehole 37.

The cabinet parts 1 and 2 are now arranged against each other in such a manner that the borehole 39 in the housing 34 coincides with the borehole 13 of the cabinet part 2. By turning the locking element 3 in the direction indicated by the arrow Sp in FIGS. 22 and 23, the expansion dowel 4 is then first of all pushed by means of the eccentric surface 27 into the borehole 13 of the cabinet part 2 and thereupon the eccentric surface formed by the undercuts 16 and 17 effects an expanding of the expansion dowel 4 as well as a clamping of the cabinet parts 1 and 2 against each other, as described above in connection with FIGS. 1 to 15. The loosening of the cabinet parts 1 and 2 from each other is effected by turning the locking element 3 in the opposite direction, i.e. by turning in the direction indicated by the arrow L.

FIGS. 25 to 35 show an embodiment of the fitting of the invention which is very similar to the embodiment in accordance with FIGS. 20 to 24 and which consists of a cylindrical or partially cylindrical housing 101 which has an inner space or a borehole 102 of circular cross section, said borehole being so arranged eccentrically to the circumference or the circumferential surface 103 of the housing 101 that a housing wall of large thickness is formed on the flattened part 103' of the circumferential surface 103.

The housing 101 is furthermore provided on its upper or front side 104 with an extension 107 which extends laterally from the housing 101 and is provided on its free end with an additional anchoring pin 108 which engages into a borehole 109 of the cabinet part 106 and is provided on the side of the housing 101 facing away from the flattened part 103'.

The approximately cylindrical locking element 110 rotatably supported in the borehole 102 is formed, in the embodiment shown, of two partially disc-shaped front walls 111 and 112 which are joined to each other at a part of the circumference of the locking element 110 via a wall section 113 and are held spaced from each other. The wall section 113 in the embodiment shown extends approximately over one-quarter of the circumference of the locking element 110. On the circumference of this locking element there are furthermore provided wall sections 115 and 116 which extend perpendicular to the end walls 111 and 112, these wall sections extending into the space between the front walls 111 and 112 and forming between them a slot 117 which is open both towards the outer periphery and towards the inner space of the locking element 110 which is defined by the front walls 111 and 112. On their inner surface facing away from the outer circumference of the locking element 110, the wall sections 115 and 116 form eccentric-shaped undercuts or undercut surfaces 118 and 119 which correspond to the undercuts 16 and 17 of the embodiments of FIGS. 1 to 24 and which, upon the turning of the locking element 110 in the housing 101, engage behind the thickened head end 125 of the expansion pin 123 and thereby effect a clamping of the cabinet part 106 to the cabinet part 120.

The wall sections 115 and 116 extend, proceeding from a transverse edge 113' of the wall section 113, also only around part of the circumference of the locking element 110, for instance around half the circumference of said locking element, so that the free, for instance rounded or beveled ends 115' and 116' of the wall sections 115 and 116 are spaced from the other transverse edge 113" of the wall section 113 by, for instance, a distance which corresponds approximately to one-quarter of the circumference of the locking element 110, as a result of which a recess 121 is formed there in the inside of the locking element 110 by the absence of the wall sections 115 and 116, the recess having a substantially greater width in the direction perpendicular to the front walls 111 and 112 than the slot 117 does.

The connecting member in this case includes an expansion dowel 122 made of elastic material and the clamping pin or expansion bolt 123 so arranged in a longitudinal bore 124 of the expansion dowel 122 that the thickened head end 125 protrudes beyond the one end of the expansion dowel 122.

At its other end the expansion bolt 123 has an expansion taper 126. A lateral longitudinal slot 127 serves for the introduction of the expansion bolt 123 into the longitudinal bore 124.

Figure 25:
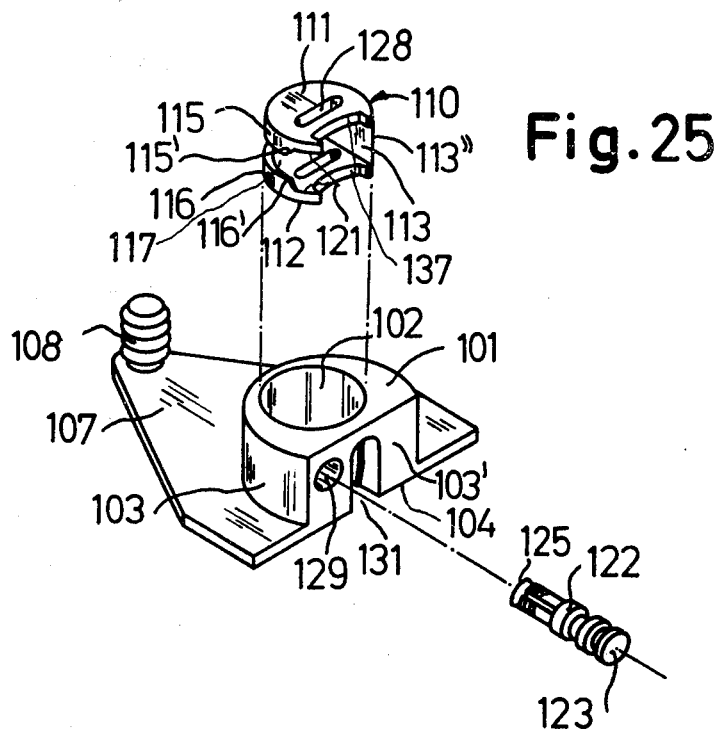
FIG. 25 shows in an exploded perspective view a fourth embodiment of the fitting of the invention before assembling in the condition for transportation or for non-use.
Figure 26:
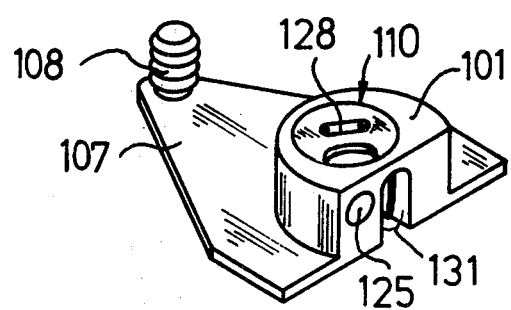
FIG. 26 shows in perspective the fitting of FIG. 25 after assembling in position of transportation or non-use.
Figure 33:
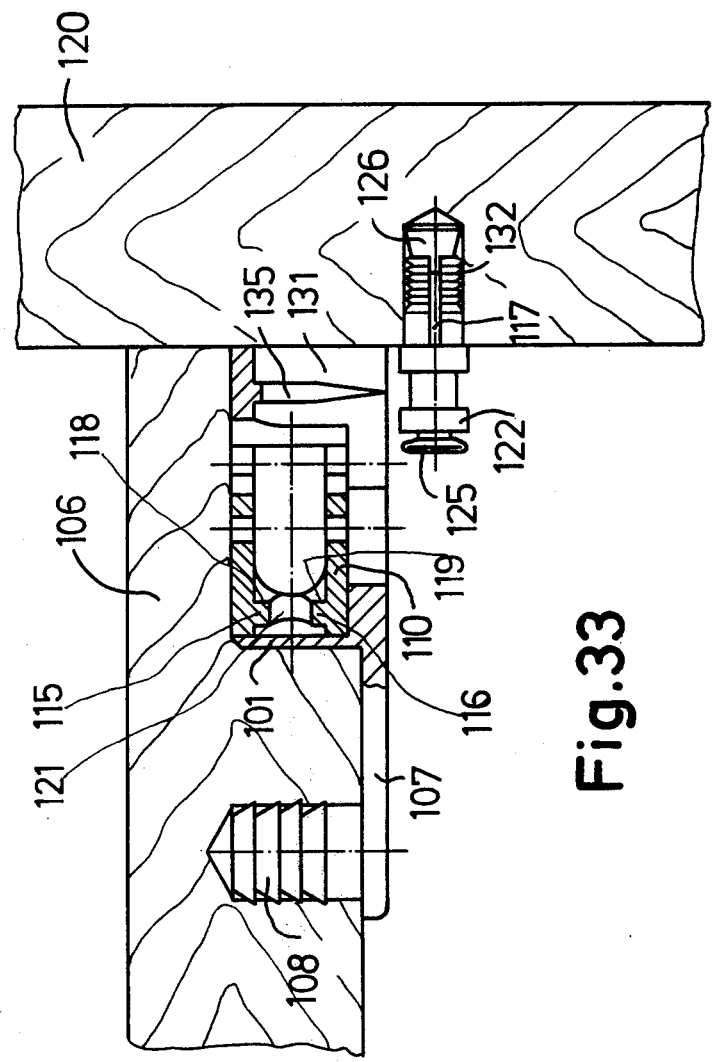
FIG. 33 is a section through the two flat cabinet parts and the fitting before the connecting of the flat cabinet parts.

For transportation, for instance, from the fitting manufacturer to the customer, the fitting is assembled in a form which is explained in connection with FIGS. 25 and 26, i.e. the locking element 110 is first of all inserted into the borehole 102 of the housing 101 and thereupon turned with a tool which engages into the slot 128, for instance a screwdriver, in such a manner in the borehole 102 that the recess 121 lies in the region of a borehole 129 which is provided on the flattened section 103' and passes approximately tangentially there through the wall of the housing 101 into the borehole 102. The borehole 129 which serves as transport borehole extends perpendicular to the axis of symmetry of the borehole 102 or perpendicular to the axis of rotation of the locking element 110. The connecting member which consists of the expansion dowel 122 and the expansion bolt 123 is now so inserted into the borehole 129 that no part of said connecting member protrudes beyond the periphery of the housing 101, i.e. the connecting member is partially received by the borehole 129 and furthermore extends through the recess 121 at least partially into the inside of the locking element 110, it being taken as basis, in the case of the embodiment shown in FIGS. 25 to 35, that for this condition of non-use of the fitting, intended for transportation, the connecting member lies in the borehole 129 with the expansion taper 126 in front, as shown in FIG. 30. The expansion taper 126 lies in this connection against the free ends 115' and 116' of the wall sections 115 and 116, the dropping of the locking element out of the housing 101 being prevented by the connecting member, which extends into the recess 121 or into the inside of the locking element 110.

If the two cabinet parts 106 and 120 are now to be connected together, then, for instance, after the fastening of the housing 101 to the cabinet part 106 (the housing 101 is held for this purpose in the borehole 105 which is open towards the front side 106' of the cabinet part 106 and the holding pin 108 is held in the borehole 109) by turning the locking element 110 in the direction indicated by the arrow A' by means of a screwdriver which is engaged in the longitudinal slot 138, the locking member is pushed at least in part out of the borehole 129 via the free ends 115' and 116' resting against the expansion taper, 126, as shown in FIG. 31. The connecting member can now be pulled by hand completely out of the borehole 129 and be placed, with the expansion taper 126 at the front, into a borehole 130 on the inner wall of the cabinet part 120, as shown in FIG. 32.

Thereupon, the two cabinet parts 106 and 120 are so arranged against each other that the front surface 106' of the cabinet part 106 lies against the inner surface of the cabinet part 120, the expansion dowel 122 being below the cabinet part 106 or below the housing 101. Upon a lowering or pushing of the cabinet part 106 in the direction towards the expansion dowel 122, the latter engages in a slot-shaped recess 131 which is provided in the flattened part 103' of the circumferential wall of the housing 101, extends through the housing wall into the inner space or the borehole 102, and is open towards the front side 104. For the final clamping of the cabinet parts 106 and 120 together, the locking element 110 is then turned further in the direction indicated by the arrow A' so that finally the wall sections 115 and 116 surround, in fork shape, the expansion bolt 123 in the region of the thickened head end 125 and push themselves in wedge form between the thickened head end 125 and the front side of the expansion dowel 122 facing said head end, whereby, by the undercuts 118 and 119 which form eccentric surfaces, the clamping bolt 123 has its expansion taper 126 pulled increasingly into the expansion dowel 122 upon the turning of the locking element 110 in the direction indicated by the arrow A' and anchors the expansion dowel 122 by expansion in the borehole 130 of the cabinet part 120.

At the start of this clamping or anchoring process, the fitting parts assume for instance the position shown in FIG. 34, the final position with the cabinet parts 106 and 120 fully clamped to each other being shown in FIG. 35. In this final position, the expansion bolt 123 lies against the end of the slot 117 in the region of the transverse edge 113 so that further turning of the locking element in the direction of the arrow A' is no longer possible. The expansion dowel 122 is provided on its expansion end with a barbed profile 132 which presses itself into the wall of the borehole 130.

In order to obtain the pressing together of the cabinet parts 106 and 120 at the same time as the expansion of the expansion dowel 122, a recess or depression 133 is provided on the circumference of the locking element 110 in the region of the slot 117, which recess or depression corresponds to the depression 24 of FIGS. 1 to 15 and the bottom surface of which serves as resting surface for the front end of the expansion dowel 122 which faces the thickened head end 125, as soon as the locking element 110 has been turned by about 90° in the direction indicated by the arrow A' out of the position shown in FIG. 34, since the depth of the depression continuously increases in the direction towards the closed end of the slot 117. Since the increase in the depth of the depression 133 is less than the increase in the distance of the undercuts 118 and 119 from the circumferential surface of the locking element 110 and thereby upon rotation of the locking element 110 in the direction indicated by the arrow A', the displacement of the expansion bolt 123 in the direction indicated by the arrow B' is always greater than the displacement of the expansion dowel 122 on basis of the depression 133, the cabinet part 106 is pressed against the cabinet part 120 with the simultaneous expanding of the expansion dowel 122 by the expansion bolt 123.

In order to assure a certain provisional connection between expansion dowel 122 and housing 101 immediately upon the introduction of the expansion dowel 122 into the slot-shaped recess 131, the expansion dowel is provided on its end facing the thickened head end 125 with an annular groove or undercut 134 into which a projection 135 in the recess 131 engages. The width of the annular groove 134 is in this connection greater than the width of the projection 135 in order to make possible the above-described pressing of the cabinet parts 106 and 120 against each other by the relative displacement between the housing 101 and the expansion dowel 122.

For the separating of the two cabinet parts 106 and 120, the locking element 110 is turned in the direction opposite the arrow A', i.e. in counterclockwise direction as seen in FIGS. 34 and 35, as a result of which finally the expansion dowel 122 as well as the expansion bolt 123 pass into the region of the recess 121 and the cabinet part 106 can be removed from the cabinet part 120. In this connection, the expansion dowel 122 as well as the expansion bolt 123 then remain in the position shown in FIG. 35, i.e. the expansion dowel 122 is anchored in the borehole 130 of the cabinet part 120 even after the cabinet part 106 has been removed. If the connecting member consisting of expansion dowel 122 and expansion bolt 123 is also to be removed, then the expansion bolt 123 is pushed by hand relative to the expansion dowel 122 in the direction opposite the arrow B'.

By an additional eccentric surface 136 which extends parallel to the undercuts 118 and 119 and is indicated by dashed lines in FIG. 35, which eccentric surface comes into engagement with the thickened head end 125 upon the turning of the locking element 110 in the direction opposite the arrow A', it is possible to push the expansion bolt 123 back into the expansion dowel 122 in the direction opposite the arrow B' upon the loosening of the fitting, whereby the anchoring of the expansion dowel 122 in the borehole 130 is also loosened.

In order to facilitate the lifting of the cabinet part 106 off from the expansion dowel 122 and the cabinet wall 120, the front walls 111 and 112 are each provided in the region of the recess 121 with a laterally open recess or notch 137.

While the clamping and expansion bolts 5 and 123 as well as the locking elements 3 and 110 preferably consist of metal, the housing 34 or 101 in the embodiments shown in FIGS. 20 to 35 is preferably made of plastic. Insofar as the mechanical stresses permit, the locking element 3 or 110 can however also be made of plastic, particularly since primarily compressive forces and no tensile forces occur in the material of the locking element 3 or 110, even when the cabinet parts 1 and 2 or 106 and 120 are clamped aginst each other.

The invention has been described above on basis of illustrative examples. It is to be understood that numerous modifications in and changes hereof are possible without thereby going beyond the inventive concept.

I claim:

1. A fitting for detachably connecting two abutting structural parts, said fitting comprising (a) a connecting member operable for insertion in a bore hole of a first of said structural parts, said connecting member comprising an expandable sleeve and a bolt-shaped expansion member, said bolt-shaped expansion member being disposed in said sleeve for axial displacement therein, one end of said expansion member defining a widening conical section operable to expand said sleeve upon displacement and a second end defining an engagement surface; and (b) a cylindrical locking element operable to be rotatably disposed in a second of said structural parts and to communicate with the engagement surface of said expansion member when said first and second structural parts are in abutting relationship, said locking element comprising (i) a first eccentric surface defining a first recess in said locking element, said eccentric surface being developed about the axis of rotation of said locking element and being operable to engage the engagement surface on said bolt-shaped expansion member at the point on said surface at maximal radial distance from the axis of rotation and upon rotation of said locking element in a first direction, to effect displacement of said bolt-shaped expansion member relative to said first structural part, and (ii) an abutment surface operable to restrain said expandable sleeve, the distance between said eccentric surface and the axis of rotation decreasing and the distance between said eccentric surface and said abutment surface increasing upon rotation of said locking member in said first direction.

2. A fitting according to claim 1 wherein when said first and second structural parts are in abutting relationship said connecting member is disposed along an axis perpendicular to the axis of rotation of said locking element.

3. A fitting according to claim 1 wherein said abutment surface is developed about the axis of rotation of said locking element.

4. A fitting according to claim 1 wherein the engagement surface of said bolt-shaped expansion member is defined by a thickened head of increased diameter and said first eccentric surface of said locking element is provided by at least one undercut operable to engage the thickened portion of said head.

5. A fitting according to claim 4 wherein said eccentric surface of said locking element is bifurcated on its face and defines a pair of parallely spaced wall sections operable to admit said expansion member anterior to said thickened portion for engagement of said thickened portion by said eccentric surface.

6. A fitting according to claim 5 wherein said eccentric surface in cross-section defines one edge of an arcuate slot, said slot being of a substantially constant width sufficient to admit an edge portion of said expansion member head.

7. A fitting according to claim 6 wherein said abutment surface defines a second eccentric surface developed about the axis of rotation of said locking member such that the distance between said second eccentric surface and the axis of rotation of said locking element decrease upon rotation of said locking member in said first direction but at a lesser rate than that at which the distance between said first eccentric surface and said axis of rotation decreases upon rotation in the same direction.

8. A fitting according to claim 7 wherein that portion of said locking element lying between said eccentric surface and said abutment surface is bifurcated so as to define a channel running perpendicular to the axis of rotation and operable to admit a portion of said expansion member adjacent to and immediately anterior to said thickened head.

9. A fitting according to claim 8 wherein said locking element includes a third surface operable upon rotation of said locking member in said first direction to urge said connecting member along its axis of displacement but in the opposite direction, and without displacement of said expansion member relative to said sleeve, into said first structural part, said third surface being disposed in said locking member at a rotational position preceding that at which said first eccentric surface engages said bolt-shaped expansion member relative to rotation in said first rotational direction.

10. A fitting according to claim 9 wherein said locking element defines a recess operable to receive a portion of said connecting member, said third surface being a third eccentric surface developed about the axis of rotation in the interior of said recess, the distance between said third eccentric surface and the axis of rotation of said locking element increasing upon rotation of said locking member in said first direction and reaching a maximum value at the point at which said first eccentric surface engages the thickened head of said bolt-shaped expansion member.

11. A fitting according to claim 1 wherein said first eccentric surface extends over approximately two adjacent cross-sectional quadrants of said locking element.

12. A fitting according to claim 1 wherein said connecting member includes at least one area of reduced cross-section in proximity to said engagement surface and said locking element includes a pair of parallely spaced eccentric ribs operable upon partial rotation of said locking member in said first rotational direction or in the reverse direction to engage said reduced cross-section for reciprocal displacement of said connecting member along the axis of displacement without expansion of said sleeve.

13. A fitting according to claim 12 wherein said first and second eccentric surfaces are disposed over approximately two adjacent corss-sectional quadrants of said locking element and said ribs are disposed over a portion of at least one of the remaining quadrants of said locking element cross-section.

14. A fitting according to claim 1 including a non-rotating mount in which said locking element is disposed, said mount being operable to anchor said locking element in said second structural part and having a circular housing operable to receive said locking element for rotation therein and a channel operable to receive said connecting member and extending perpendicular to the axis of rotation of said locking element in said housing.

15. A fitting according to claim 14 having a second channel substantially parallel to said first channel, said second channel being disposed approximately tangentially to said circular housing and being operable to receive said connecting member, said locking member having a tangential edge portion operable to urge said connecting member from said second channel upon rotation of said locking member.

* * * * *